United States Patent
Maggi et al.

(10) Patent No.: US 10,677,993 B2
(45) Date of Patent: Jun. 9, 2020

(54) SYSTEM FOR COUPLING LIGHT TO INTEGRATED DEVICES AND CORRESPONDING METHOD

(71) Applicant: STMicroelectronics S.r.l., Agrate Brianza (IT)

(72) Inventors: Luca Maggi, Garlate (IT); Marco Piazza, Busto Arsizio (IT); Giuseppe Cusmai, San Giuliano Milanese (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 15/078,785

(22) Filed: Mar. 23, 2016

(65) Prior Publication Data

US 2017/0090123 A1    Mar. 30, 2017

(30) Foreign Application Priority Data

Sep. 30, 2015   (IT) .......................... 102015000056966

(51) Int. Cl.
| | |
|---|---|
| *G02B 6/32* | (2006.01) |
| *G02B 6/34* | (2006.01) |
| *G02B 6/30* | (2006.01) |
| *G02B 6/293* | (2006.01) |

(52) U.S. Cl.
CPC ........... *G02B 6/34* (2013.01); *G02B 6/29305* (2013.01); *G02B 6/30* (2013.01); *G02B 6/32* (2013.01)

(58) Field of Classification Search
CPC ............... G02B 6/34; G02B 6/30; G02B 6/32
USPC ....................................................... 385/33–39
See application file for complete search history.

(56) References Cited

U.S. PATENT DOCUMENTS

| 4,747,655 | A | * | 5/1988 | Shirasaki | ................. | G02B 5/04 |
| | | | | | | 385/36 |
| 4,995,721 | A | | 2/1991 | Krupa et al. | | |
| 5,777,971 | A | * | 7/1998 | Choi | ..................... | G11B 7/0037 |
| | | | | | | 369/103 |
| 6,289,155 | B1 | * | 9/2001 | Wade | ................. | G02B 6/29329 |
| | | | | | | 385/33 |
| 6,487,016 | B1 | * | 11/2002 | Shiono | ................... | G11B 7/123 |
| | | | | | | 359/566 |
| 6,829,096 | B1 | * | 12/2004 | Wade | .................. | G02B 5/1814 |
| | | | | | | 359/566 |
| 9,207,396 | B2 | * | 12/2015 | Wang | ................. | G02B 6/02019 |
| 2005/0238284 | A1 | * | 10/2005 | Takushima | ......... | G02B 6/29311 |
| | | | | | | 385/24 |
| 2013/0182998 | A1 | | 7/2013 | Andry et al. | | |
| 2013/0272650 | A1 | * | 10/2013 | Ishikawa | ................. | G02B 6/35 |
| | | | | | | 385/17 |
| 2014/0205291 | A1 | * | 7/2014 | Suzuki | ................. | G02B 6/3518 |
| | | | | | | 398/48 |

(Continued)

*Primary Examiner* — Ellen E Kim
(74) *Attorney, Agent, or Firm* — Seed IP Law Group LLP

(57) ABSTRACT

System for coupling light to integrated devices, comprising a grating coupler which couples light, such as light from a light source, into an optic fiber. The system includes an optic subsystem comprising a transmitter portion receiving the light emitted by the grating coupler and a receiver portion receiving light from the transmitter and focusing the light into the integrated device, the transmitter portion being configured to modify an angle distribution of the light emitted by the grating coupler and the receiving portion being configured to focus the light with modified angle distribution into the integrated device.

19 Claims, 5 Drawing Sheets

(56) References Cited

U.S. PATENT DOCUMENTS

2015/0212307 A1\* 7/2015 Dohi ................. G02B 21/06
359/385

\* cited by examiner

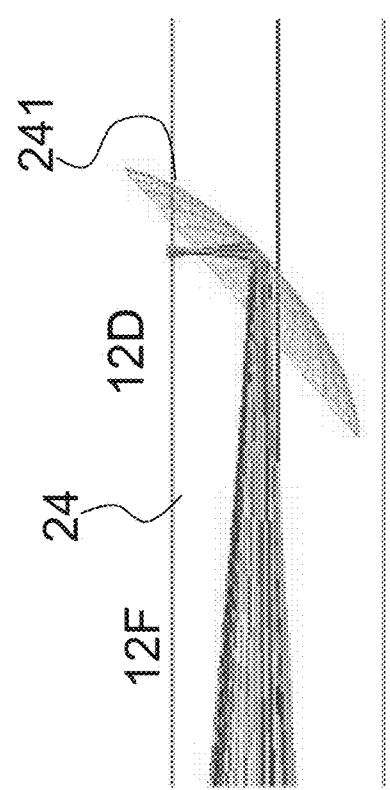
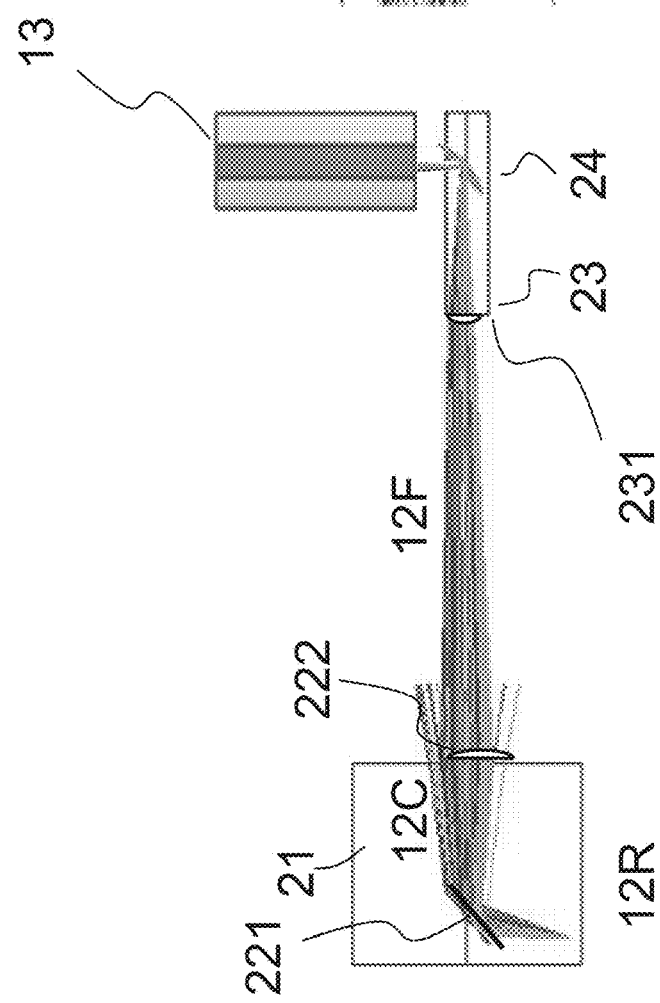
Fig. 4A
Fig. 4B

SYSTEM FOR COUPLING LIGHT TO INTEGRATED DEVICES AND CORRESPONDING METHOD

BACKGROUND

Technical Field

The present description relates to techniques for coupling light to integrated devices.

Description of the Related Art

For Wavelength Division Multiplexing (WDM), especially CWDM (Coarse WDM), applications one of the major concerns related to Silicon Photonics, or VHIC (Very High Index Contrast) technologies in general, is the bandwidth limitations of the grating coupler (GC) used to couple light in and out of the integrated devices. Depending on the nature of light the grating couplers are intended for, two kinds of grating coupler can generally be considered: Single Polarization Grating Couplers (SPGC) and Polarization Splitting Grating Couplers (PSGC). A 1 dB bandwidth for SPGC and PSGC is typically in the range of 20-25 nm. CWDM applications target 4λ with separation of 20 nm, so the total wavelength span is 60 nm requiring a total input/output bandwidth of approximately 80 nm to take into account possible source wavelength variations, technological tolerances and temperature dependences.

The main limitation to the bandwidth is not related to the GC itself, but in the system collecting/injecting light from/to the grating coupler. Considering the Grating Equation shown herebelow, it is clear that different wavelengths are emitted/accepted at different angles $$\frac{1}{\Lambda} = \frac{1}{\lambda}(n_{eff} - \sin(\theta)) \quad (1)$$

where $\Lambda$ is the grating period, $n_{eff}$ the effective waveguide index and $\theta$ the emission/insertion angle with respect to the normal of the grating plane (XY in FIG. 1).

Typically a Single Mode Fiber (SMF) can collect/inject optimally only one wavelength, due to the fact that it is positioned at a fixed angle and position with respect to the CG.

In FIG. 1 it is schematically shown a system 10 with conventional coupling, where, given an horizontal plane defined by orthogonal horizontal axes X and Y, a grating coupler 11 lies in such XY plane and receives incident light 12 along axis Y, for instance from a laser source, and emits by diffraction a emitted light 12R at different emission angles with a given angle distribution according to the different wavelengths $\lambda_1$, $\lambda_2$, $\lambda_3$, as defined by the Grating Equation (1) above, in the general direction of an integrated optic device represented by a fiber 13, for example a SMF fiber, which is, in FIG. 1, arranged as angled fiber, with its main longitudinal axis not parallel to the axis Y of the grating coupler 11. As shown in FIG. 1 only light at wavelength $\lambda_2$ is optimally collected.

Thus, in conventional GC to SMF coupling, due to wavelength dependent emission angle, the collecting system is bandwidth limited.

BRIEF SUMMARY

An embodiment provides a system for coupling light to integrated devices that facilitates reducing the angular wavelength dependence and increasing the coupling bandwidth.

According to an embodiment described herein, the system includes an optic subsystem comprising a transmitter portion receiving the light emitted by the grating coupler and configured to generate a collimated beam and a receiver portion receiving light from the transmitter and focusing the light into the integrated device.

In an embodiment, the transmitter portion is configured to modify an angle distribution of the light emitted by the grating coupler and the receiving portion is configured to focus the light with modified angle distribution into the integrated device.

In an embodiment, the transmitter portion includes a polynomial mirror receiving the emitted light and a collimating lens for modifying the beam angle of the beams in the reflected light at the different wavelengths.

In an embodiment, the receiving portion includes a focusing lens to focus the collimated light with a modified angle distribution from the transmitter portion in a focused light beam into the integrated device.

In an embodiment, the optic subsystem includes a deflecting part configured to receive said focused light and to deflect it in a deflected light into the integrated device.

In an embodiment, the deflecting part comprises a polynomial mirror.

In an embodiment, the integrated device is an optic fiber, such as a Single Mode Fiber.

In an embodiment, the system is employed in a Wavelength Division Multiplexing (WDM) optic system.

In an embodiment, a method for coupling light to integrated devices, comprises coupling light by a grating coupler which couples light, in particular coming from a light source, into an integrated device, in particular an optic fiber, including modifying an angle distribution of the light emitted by the grating coupler and focusing the light with modified angle distribution into the integrated device.

In an embodiment, the method includes deflecting said focused light into the integrated device.

In an embodiment, a system comprises: a grating coupler configured to receive and to emit beams of light; and an optic subsystem configured to couple between the grating coupler and optical circuitry, the optic subsystem having: a collimator configured to collimate beams of light emitted by the grating coupler; and a focusing portion configured to focus collimated beams of light emitted by the collimator and to emit focused beams of light. In an embodiment, the collimator is configured to modify an angle distribution of beams of light emitted by the grating coupler; and the focusing portion is configured to focus the beams of light with modified angle distributions into the optical circuitry. In an embodiment, said collimator includes a polynomial mirror configured to receive beams of light emitted by the grating coupler and a collimating lens configured to modify beam angles of beams of light reflected by the polynomial mirror. In an embodiment, said focusing portion includes a focusing lens configured to focus collimated beams of light into the optical circuitry. In an embodiment, said optic subsystem includes a deflector configured to receive focused beams of light emitted by the focusing portion and to deflect the focused beams of light into the optical circuitry. In an embodiment, the deflector comprises a polynomial mirror. In an embodiment, said optical circuitry is an integrated circuit chip having optical components using grating couplers as Input/Output (I/O) optical ports. In an embodiment, said optical circuitry comprises an optic fiber and the focusing portion is configured to emit focused beams of light into the optic fiber. In an embodiment, the optic fiber is a single mode fiber. In an embodiment, the optic fiber has a horizontal axis generally parallel to an axis on which the grating coupler is configured to receive incident beams of light. In an embodiment, the system comprises a Wavelength Division Multiplexing optic system.

In an embodiment, a method comprises: receiving and emitting, using a grating coupler, beams of light, an angle distribution of the emitted beams of light being a function of respective wavelengths of the beams of light; modifying, using an optical subsystem coupled between the grating coupler and optical circuitry, the angle distribution of the beams of light emitted by the grating coupler; and focusing, using the optical subsystem, the beams of light having the modified angle distribution into the optical circuitry. In an embodiment, the focusing the beams of light having the modified angle distribution into the optical circuitry comprises deflecting the focused beams of light into the optical circuitry. In an embodiment, the optical subsystem comprises a polynomial mirror configured to receive beams of light emitted by the grating coupler and a collimating lens configured to modify beam angles of beams of light reflected by the polynomial mirror.

In an embodiment, a device comprises: a grating coupler having an axis configured to receive incident light and emit light, with an angle distribution of the emitted light corresponding to a wavelength of the incident light; and optical components configured to receive light emitted by the grating coupler and to emit light into optical circuitry, the optical components including: a collimator configured to collimate light emitted by the grating coupler; and a focusing lens configured to focus collimated light emitted by the collimator. In an embodiment, the collimator is configured to modify the angle distribution of light emitted by the grating coupler; and the focusing lens is configured to focus the light with modified angle distributions into the optical circuitry. In an embodiment, said collimator includes a polynomial mirror configured to receive beams of light emitted by the grating coupler and a collimating lens configured to modify beam angles of beams of light reflected by the polynomial mirror. In an embodiment, said optical components include a deflector configured to receive light emitted by the focusing lens and to deflect light into the optical circuitry. In an embodiment, the deflector comprises a polynomial mirror. In an embodiment, the optical circuitry comprises a single mode optic fiber and the optical components are configured to emit focused light into the single mode optic fiber. In an embodiment, the single mode optic fiber has a horizontal axis generally parallel to the axis on which the grating coupler is configured to receive incident light. In an embodiment, the device comprises: an integrated circuit chip including the optical circuitry. In an embodiment, the integrated circuit chip includes the grating coupler and the optical components.

BRIEF DESCRIPTION OF THE SEVERAL VIEWS OF THE DRAWINGS

The solution will now be described purely by way of a non-limiting example with reference to the annexed drawings, in which:

FIGS. 4A and 4B represents by a schematic view and a zoom view the operation of the second embodiment of FIG. 2B.

DETAILED DESCRIPTION

The ensuing description illustrates various specific details aimed at an in-depth understanding of the embodiments. The embodiments may be implemented without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is meant to indicate that a particular configuration, structure, or characteristic described in relation to the embodiment is comprised in at least one embodiment. Likewise, phrases such as "in an embodiment" or "in one embodiment", that may be present in various points of the present description, do not necessarily refer to the one and the same embodiment. Furthermore, particular conformations, structures, or characteristics can be combined appropriately in one or more embodiments.

The references used herein are intended merely for convenience and hence do not define the sphere of protection or the scope of the embodiments.

Figure 2:
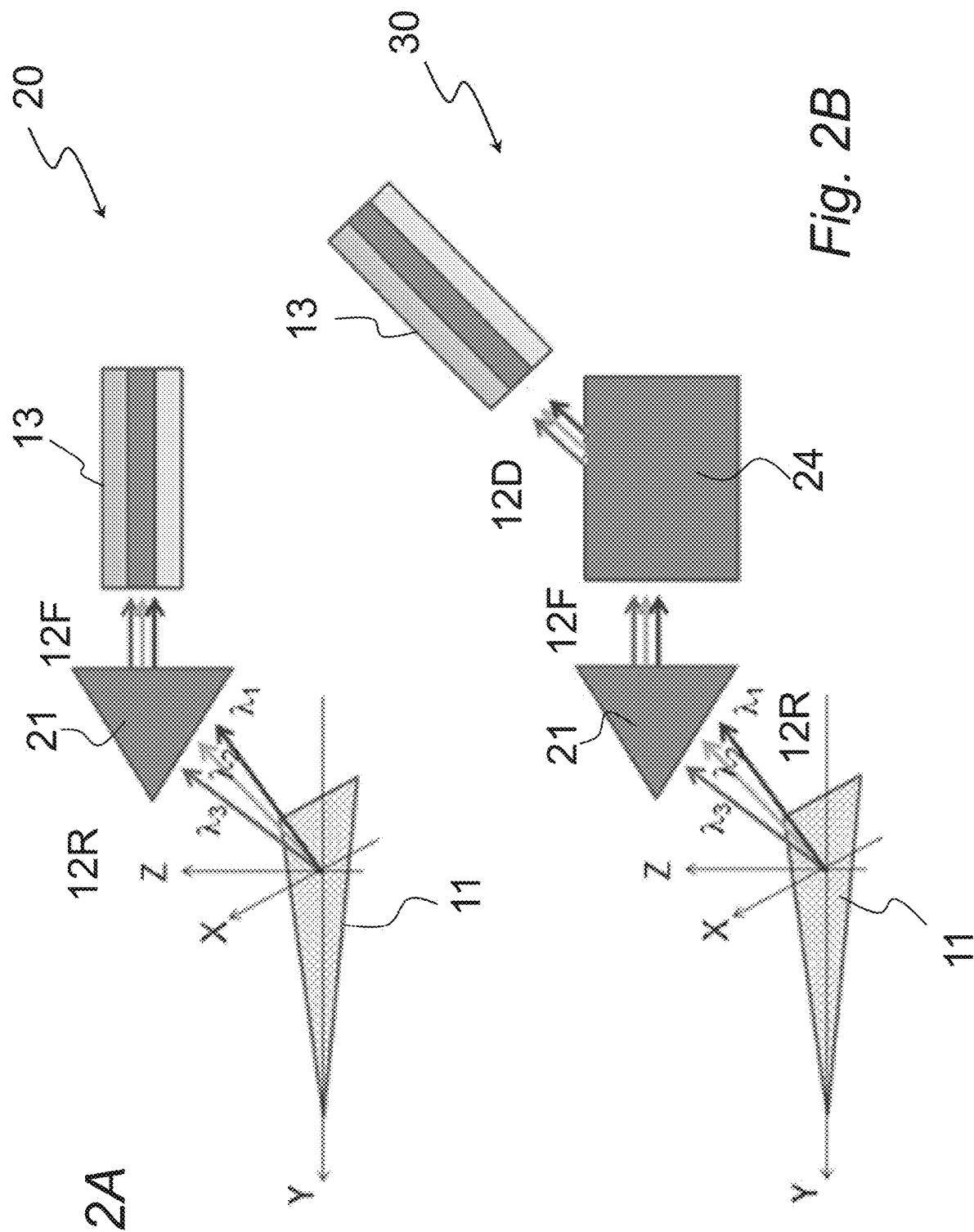
FIGS. 2A and 2B represent schematically two embodiments of the system here described, respectively in a single deflector system (FIG. 2A) and in double deflector system (FIG. 2B)

In FIG. 2A it is shown a first embodiment of a system for coupling light to integrated devices 20 in which an optic subsystem, an optic device 21, is interposed between the emitted light 12R scattered at different wavelengths, e.g., $\lambda_1$, $\lambda_2$, $\lambda_3$ according to a distribution defined by the Grating Equation (1), and the integrated optic device, specifically the fiber 13 arranged as horizontal fiber, generally parallel to the axis Y of the grating coupler 11.

Figure 3:
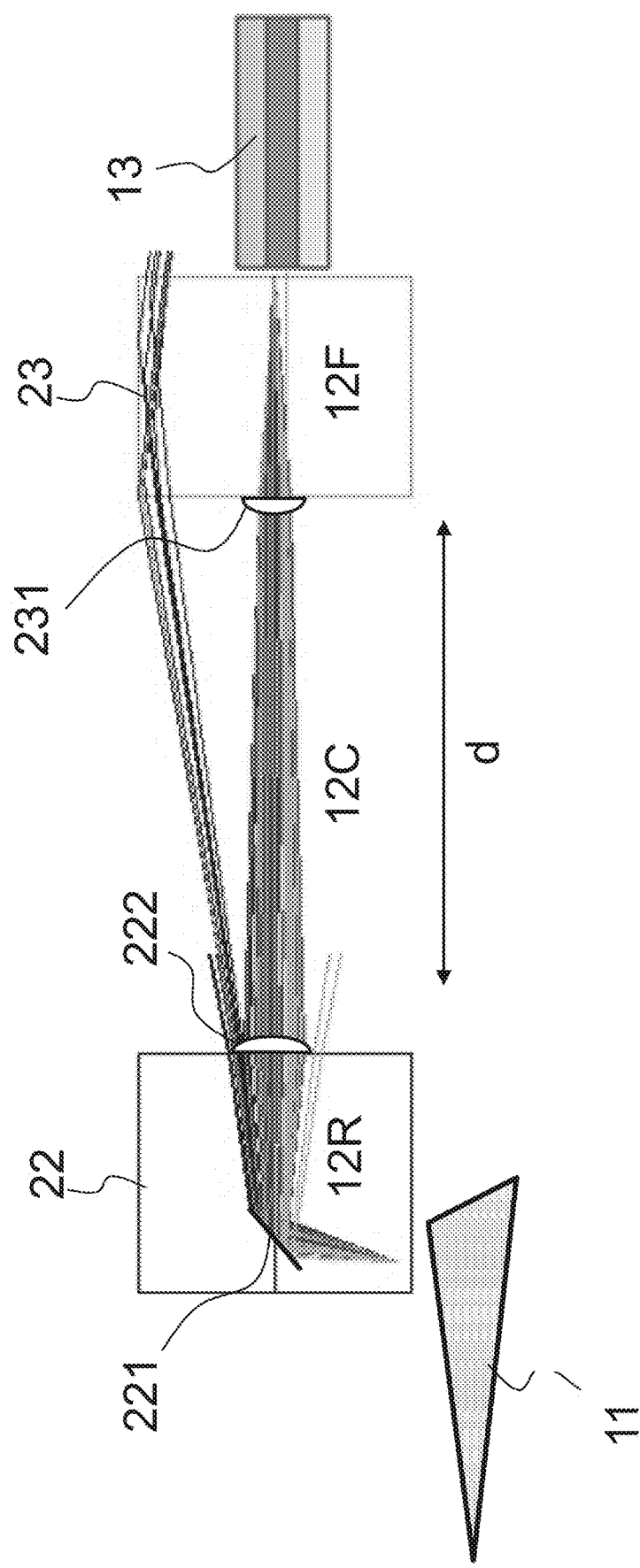
FIG. 3 represents schematically the operation of the first embodiment of FIG. 2A.

The optic device 21 presents a collimating part 22 and a collecting part 23 (see FIG. 3). The collimating part 22 receives the emitted light 12R from the grating coupler 11, which is emitted at different angles identifying a given angle distribution according to the different wavelengths, e.g., $\lambda_1$, $\lambda_2$, $\lambda_3$, and modifies such angle distribution of the emitted light 12. The collecting part 23 focuses the light with modified angle distribution (indicated as collimated light 12C in FIG. 3) in a focused light beam 12F, which is in particular focused into the fiber 13. This two part configuration is helpful for the operation of the system 20, reducing the sensitivity to alignment tolerance.

According to an embodiment, shown in FIG. 3, the collimating part 22 includes a polynomial mirror 221 operating in combination with a lens 222 for modifying the beam angle of the beams at the different wavelengths in the emitted light 12R.

The part 22 is considered collimating and generates an output beam which is at least slightly focused. The choice between ideally collimated beam or slightly focused beam is driven by alignment tolerances between part 22 and part 23.

A pure collimated beam can be aligned with large tolerance with respect to the perfect focused beam.

The polynomial mirror 221 may have a high conical constant, whose absolute value is much greater than one, by way of example a hyperbolic surface or an elliptical oblate surface. The collecting part 23 in such embodiment 20 includes a focusing lens 231, which may be a commercially available focusing lens.

In an embodiment, the height of the collimating lens 222 is 0.5 mm and the radius of curvature is 330 um. The polynomial mirror 221 has a radius of curvature of 9.374 mm and high conic constant (k=−801.779). The distance d between the collimating part 22 and collecting part 23, shown in FIG. 3, is 2 mm.

In an embodiment, a commercially available focusing lens 231 used in the collecting part 23 has a radius of curvature of 330 um and thickness 0.831 mm. The height is 90 um.

The material employed for all the optical elements in the example embodiment of FIGS. 2A and 3 may be fused silica.

FIG. 2A represents a single deflector system, in which the part 21 deflects the light in direction of the fiber 13. In FIG. 2B it is shown schematically a different embodiment 30 of the optical device, a double deflector system, which may be used for an angled fiber arrangement, which includes a deflecting part 24, which receives light from the collecting part 23 and conveys it in a deflected beam 12D into the fiber 13 arranged in the angled fiber arrangement. The deflecting part 24 may include a polynomial mirror 241, as shown in FIG. 4B. The polynomial mirror 241 is arranged so that in this configuration the deflected beam 12D exits from the optical device 30 with the same exit angle for all the wavelengths.

Figure 1:
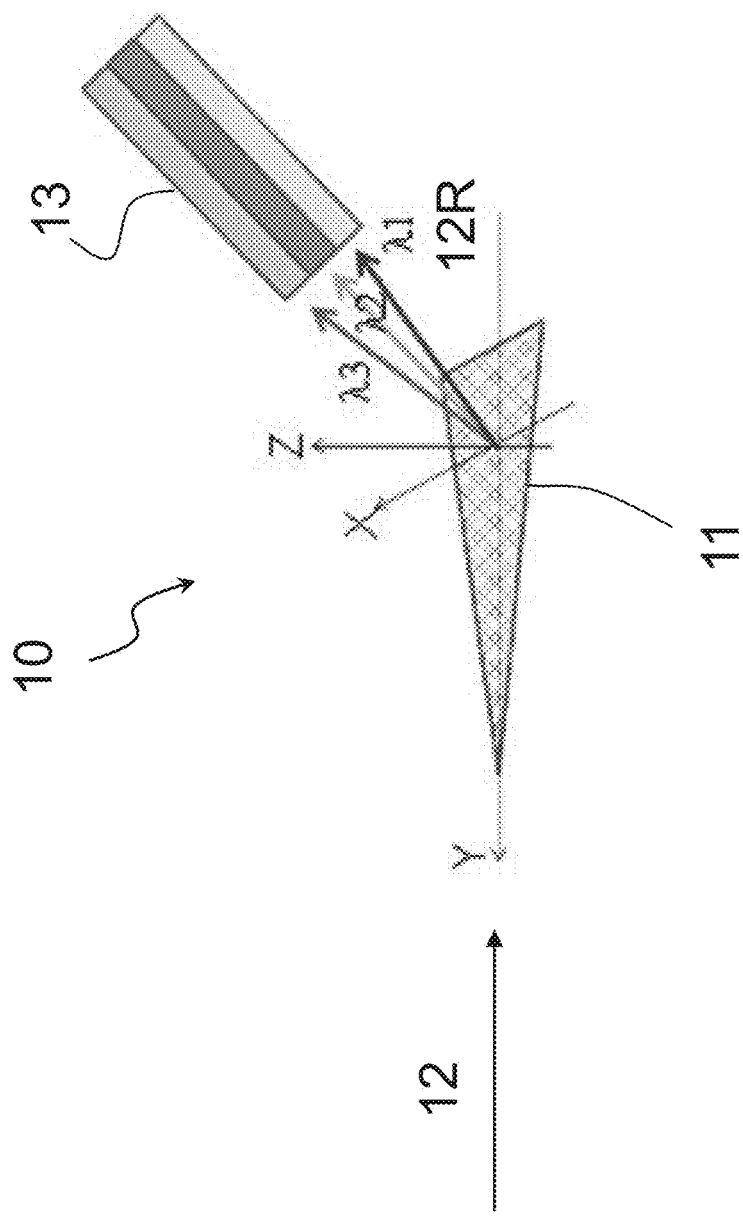
FIG. 1 illustrates a conventional grating coupler.

In such a way an embodiment may be retro-compatible with fibers and tools used for conventional coupling, such as the one shown in FIG. 1.

Also for the embodiment of FIGS. 2B, 3, 4A, 4B the material employed for all optical elements may be fused silica.

The second polynomial mirror 241 may have, for example, a radius of curvature of 380 um and a conic constant k=4.109.

In this embodiment the collimating lens 221 may have, for example, a height of 0.5 mm and radius of curvature of 330 um. The first polynomial mirror 222 may have, for example, a radius of curvature of 7.859 mm and a conic constant k=1639.20. The focusing lens 231 may have, for example, a height of 90 um and radius of curvature 330 um.

To facilitate improving the alignment between the grating coupler 11 and the collimating lens 221 a direct writing technique like Two Photons Absorption (TPA) may be used.

An embodiment facilitates realizing a lens plus a polynomial mirror directly on the top of the grating coupler 11, while maintaining the tolerances as small as possible, neglecting the effect of the alignment between the grating coupler and the micro optical sub-system 21. Also with the TPA technique, wafer level testability may be addressed.

The lens 221, 231 used in collimating and collecting part may be, for example, a spherical, aspherical, Fresnel or GRIN (GRaded INdex) lens. The material may be fused silica, as mentioned, however glass or polymer materials may be employed. GRIN material is also suitable.

The polynomial mirrors 222, 241 may include an external metal coating.

In an embodiment, a target wavelength range may be centered at 1310 nm with a bandwidth greater than 30 nm, however the target wavelength may be centered at any wavelength of the optical communications windows.

Figure 5:
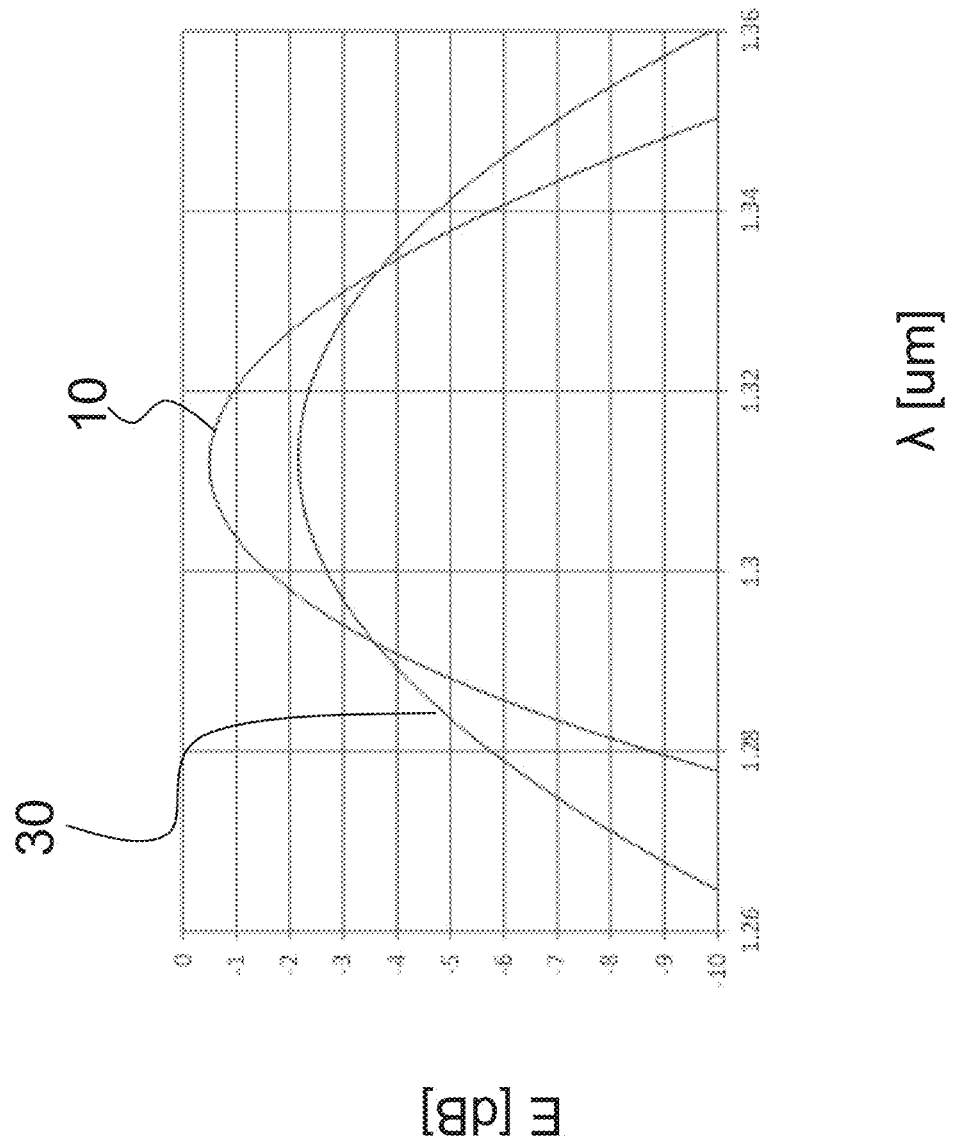
FIG. 5 represents a diagram showing the efficiency of the embodiment of FIG. 3 with respect to the efficiency of the prior art system of FIG. 1.

In FIG. 5 it is represented a diagram showing the coupling efficiency E, expressed in dB, as a function of the wavelength λ in the incident light 12 for the system 10 of FIG. 1 and an embodiment of the system 30 of FIG. 2B. As it can be seen, when wide bandwidths are considered, in bandwidth ranges where the curve corresponding to system 30 has lower losses than the curve corresponding to system 10.

An embodiment, with the insertion of a micro-optical system between the grating coupling and the integrated optic device, facilitates reducing the angular wavelength dependence and increasing the coupling bandwidth.

An embodiment uses an external optical device to collect/inject the different wavelengths at their own grating angle, which facilitates reducing or cancelling limitations of the bandwidth. An embodiment facilitates improving the bandwidth as well as the loss at the band edges.

An embodiment is suitable for CWDM without modifying the Silicon Photonics Circuit (or VHIC circuits in general).

Of course, without prejudice to the principle of the embodiments, the details of construction and the embodiments may vary widely with respect to what has been described and illustrated herein purely by way of example, without thereby departing from the scope of the present embodiments.

As mentioned embodiments of the described systems and methods may be applied to integrated optical components using the Grating Couplers as Input/Output (I/O) optical ports and may be suitable for wide bandwidth applications like Coarse Wavelength Division Multiplexing (CWDM) applications.

Embodiment may be used in connection to optical devices based on Silicon Photonics or Very High Index Contrast (VHIC) technologies.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a grating coupler configured to receive and to emit beams of light; and
an optic subsystem configured to couple between the grating coupler and optical circuitry, the optic subsystem having:
a collimator having a polynomial mirror and a collimating lens, the polynomial mirror configured to directly receive beams of light emitted by the grating coupler and the collimating lens configured to modify beam angles of beams of light reflected by the polynomial mirror; and
a focusing portion configured to focus collimated beams of light emitted by the collimator and to emit focused beams of light, wherein:
the collimator is configured to modify an angle distribution of beams of light emitted by the grating coupler; and
the focusing portion is configured to focus the beams of light with modified angle distributions into the optical circuitry.

2. The system according to claim 1 wherein said focusing portion includes a focusing lens configured to focus collimated beams of light into the optical circuitry.

3. The system according to claim 1 wherein said optic subsystem includes a deflector configured to receive focused beams of light emitted by the focusing portion and to deflect the focused beams of light into the optical circuitry.

4. The system according to claim 3 wherein the deflector comprises a polynomial mirror.

5. The system according to claim 1 wherein said optical circuitry is an integrated circuit chip having optical components including grating couplers as Input/Output (I/O) optical ports.

6. The system according to claim 1 wherein said optical circuitry comprises an optic fiber and the focusing portion is configured to emit focused beams of light into the optic fiber.

7. The system of claim 6 wherein the optic fiber is a single mode fiber.

8. The system of claim 6 wherein the optic fiber has a horizontal axis parallel to an axis on which the grating coupler is configured to receive incident beams of light.

9. The system according to claim 1 wherein the system comprises a Wavelength Division Multiplexing optic system.

10. A device, comprising:
a grating coupler having an axis configured to receive incident light and emit light, with an angle distribution of the emitted light corresponding to a wavelength of the incident light; and
optical components configured to receive light emitted by the grating coupler and to emit light into optical circuitry, the optical components including:
a collimator configured to directly receive beams of light emitted by the grating coupler and to collimate the beams of light emitted by the grating coupler, the collimator having a polynomial mirror and a lens, the polynomial mirror configured to directly receive beams of light emitted by the grating coupler and the lens configured to modify beam angles of beams of light reflected by the polynomial mirror; and
a focusing lens configured to focus collimated light emitted by the collimator, wherein the collimator is configured to modify the angle distribution of light emitted by the grating coupler.

11. The device of claim 10 wherein:
the focusing lens is configured to focus the light with modified angle distributions into the optical circuitry.

12. The device of claim 10 wherein said optic components include a deflector configured to receive light emitted by the focusing lens and to deflect light into the optical circuitry.

13. The device of claim 12 wherein the deflector comprises a polynomial mirror.

14. The device of claim 10 wherein said optical circuitry comprises a single mode optic fiber and the optical components are configured to emit focused light into the single mode optic fiber.

15. The device of claim 14 wherein the single mode optic fiber has a horizontal axis parallel to the axis on which the grating coupler is configured to receive incident light.

16. The device of claim 10, comprising:
an integrated circuit chip including the optical circuitry.

17. The device of claim 16 wherein the integrated circuit chip includes the grating coupler and the optical components.

18. The system of claim 1 wherein the polynomial mirror of the collimator is positioned on the grating coupler.

19. The device of claim 10 wherein the polynomial mirror of the collimator is positioned on the grating coupler.

* * * * *